Oct. 7, 1958        H. J. TYLER        2,855,153

THERMOSTATICALLY CONTROLLED FLUID VALVES

Filed June 28, 1956

INVENTOR
Hugh J. Tyler

BY

HIS ATTORNEY

United States Patent Office 2,855,153
Patented Oct. 7, 1958

2,855,153

THERMOSTATICALLY CONTROLLED FLUID VALVES

Hugh J. Tyler, Jeannette, Pa., assignor to Robertshaw-Fulton Controls Company, Greensburg, Pa., a corporation of Delaware Application June 28, 1956, Serial No. 594,495

8 Claims. (Cl. 236—99)

This invention relates to thermostatically controlled fluid valves and more particularly to a thermostatically controlled water valve that is adapted to control the flow of fluid to a vehicle heater or heat exchanger in response to changes in the temperature of a medium flowing over the heat exchanger.

The primary object of the present invention is the construction of a thermostatically controlled fluid valve having an adjustable heat range, the heat range capable of adjustment to selectively vary the flow capacity of the valve.

Another object of the present invention is to eliminate the use of a fixed-pivot valve member control lever in a thermostatically controlled fluid valve.

Another object of the present invention is to vary the heat range of a thermostatically controlled fluid valve by shifting the axis of rotation of the valve member control lever through the instrumentality of a cam-controlled yoke member.

Another object of the present invention is to use only a single spring in a thermostatically controlled fluid valve, the spring providing a plurality of functions.

Another object of the invention is to calibrate a thermostatically controlled fluid valve by means of a wedge shaped member adjustably positioned between the valve member control lever and its support means.

Other objects and advantages of the present invention will become apparent from the following description taken in connection with the accompanying drawing wherein:

Fig. 6 is a perspective view of a modification of one of the components of the thermostatically controlled fluid valve.

While this invention is particularly adapted for use in combination with an automotive vehicle heating system, it is to be understood that the invention is not to be limited to this particularly environmental application since the invention is capable of any application where it is desirable to use a thermostatically controlled fluid valve provided with an adjustable heat range.

Figures 2, 3:
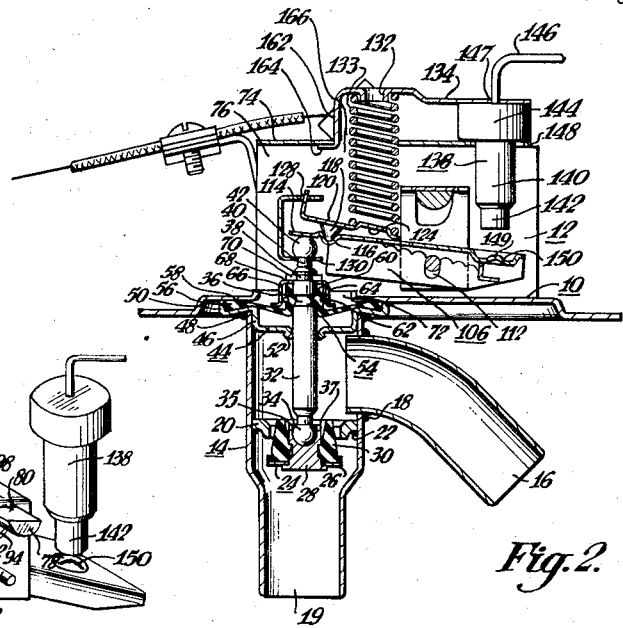
Fig. 2 is a longitudinal section through the thermostatically controlled valve shown by Fig. 1, the section being rotated 180°.
Fig. 3 is a perspective view of the valve member control lever and parts operatively associated therewith.

Referring more particularly to the drawing, Figs. 1 to 5 inclusive, show a preferred embodiment of the present invention wherein the thermostatically controlled fluid valve comprises a mounting plate 10 having a U-shaped frame member 12 mounted on the upper side thereof and carrying a tubular valve housing 14 on the underside thereof. A tubular inlet conduit 16 extends through the wall of valve housing 14 and is secured thereto by any suitable means, such as brazing or welding. A welding or brazing fillet 18 is shown in Fig. 2. The valve housing 14 is reduced in diameter at 19 to provide an outlet.

Disposed within the interior of valve housing 14 is an apertured valve seat 20. Valve seat 20 is secured to the inner wall of the casing 14 by any suitable means, preferably welding or brazing, a fillet being shown at 22.

A valve member generally designated at 24 is also disposed within housing 14 and is adapted to move within the housing between a plurality of controlling positions. The valve member 24 comprises a disc 26 carried by a centrally located body member 28 surrounded by an annular resilient seal 30. The annular seal 30 is connected to the disc 26 and body member 28 by any suitable means and engages the valve seat 20 when the valve member 24 is moved to the closed position, the peripheral surface of the seal 30 also functioning as a guide for the valve member 24 as the seal 30 moves upwardly and downwardly through the apertured valve seat 20.

The valve member 24 is carried by a valve stem 32 having a spherical head 34 on the lower end thereof as viewed in Fig. 2. The spherical head 34 on the valve stem 32 is seated within a socket or recess 35 formed in valve member body member 28 and the socket or recess 35 thus formed defines a thin-shelled wall 37 on the upper portion of the body member 28. The spherical head 34 is retained in socket 35 by any suitable means, preferably by peening the thin-shelled wall 37 of the socket into engagement with the surface of the spherical head 34. Adjacent the upper end, the valve stem 32 is provided with a relatively large annular recess 36 and a small annular recess 38. Adjacent recess 38, the valve stem 32 is also provided with a reduced diameter portion 40 terminating in a spherical head 42 formed on the upper end of the stem.

Valve casing 14 is adapted to be carried by a concentrically reduced circular plate generally designated at 44. One of the concentric reductions in plate 44 defines a cylindrical wall 46 which is adapted to closely fit within the inner bore of housing 14. The housing 14 is secured to the plate 44 by any suitable means, preferably welding or brazing a fillet being shown at 48. Another of the cylindrical reductions in plate 44 defines an outer cylindrical wall 50, the end face of which abuts the underside of plate 10 and which is secured thereto by any suitable means. Plate 44 is also provided with a centrally disposed aperture 52 therein to accommodate the movement therethrough of valve stem 32.

A seal generally designated by the reference numeral 54 surrounds the upper portion of the valve stem 32. The seal 54 includes a bead portion 56 which is anchored in the space between the wall 50 of plate 44 and the bottom surface of mounting plate 10. Integrally formed with bead portion 56 is a web portion 58 which terminates in an annular central portion 60 surrounding the upper portion of the stem 32. An annular ring 62 tightly engages the periphery of seal portion 60 and produces therein an annular inwardly deflected portion 64 which tightly anchors the seal 54 to valve stem 32, the annular deflected portion 64 being seated within the annular recess 36 in the stem. Surrounding the portion 60 of the seal 54 and engaging the periphery of annular ring 62 is a generally cup-shaped annular member 66 adapted to shield the exposed upper end of the seal 54. Cup-shaped member 66 is provided with an aperture 68 therein, the aperture 68 being slightly larger in diameter than the diameter of stem 32.

The cup-shaped member 66, the seal 54 and the valve stem 32 are held in the assembled position by means of a resilient clip 70 adapted to seat in the annular recess 38 in the stem 32. In assembling these components, member 66 is slipped over the spherical head 42 of the stem 32 and then pushed axially along stem 32 to produce a slight compression in portion 60 of the seal. In this compressed state of the seal 54, clip 70 is inserted into recess 38 to anchor member 66 in its protective position.

Mounting plate 10 is provided with an opening 72 therein through which the upper portion of the stem 32 and the components attached thereto may reciprocate as the valve member 24 moves between its controlling positions. It will also be noted that the web portion 58 of the seal 54 is constantly flexed as the valve member 24 moves toward the open position.

The U-shaped frame member 12 is comprised of a ceiling portion 74 and a pair of opposed side wall members 76, only one side wall member 76 being shown. Extending transversely of and beyond the side walls 76 of frame member 12, as best shown in Fig. 3, is a cam means 78 comprising a half-round shaft having a diametral flat portion 80 thereon. Shaft 78 extends through and is journaled in a pair of aligned circular apertures 82 in the side walls 76 of frame member 12, only one side wall aperture 82 being shown.

Being adapted to engage shaft 78 and also extending transversely of frame member 12 is a C-shaped yoke member generally designated by the reference numeral 84. As best shown in Fig. 3, the yoke member 84 includes base portion 86 and a pair of opposed angular bent end portions 88 and 90. Each of the bent end portions 88 and 90 is provided with a substantially quadrant-shaped aperture 92 therein, only one of the apertures 92 being shown. Each aperture 92 is shaped to provide a plurality of guide surfaces 94, 96 and 98 for the shaft 78 along the inner walls of the aperture. In the preferred embodiment of the invention, as best shown in Figs. 2 and 3, each aperture 92 includes a pair of uni-planar or straight line walls or guide surfaces 96 and 98 intersecting each other at approximately a right angle and a curvilinear wall or guide surface 94 connecting the two straight line guide surfaces at the extremities thereof. Guide surface 98 is adapted to register with the diametral flat portion 80 on shaft 78 whereas guide surfaces 94 and 96 slidably engage the rounded peripheral surface of the shaft.

In addition to being substantially quadrant shaped, each aperture 92 is so dimensioned that the guide surfaces 94, 96 and 98 snugly engage the shaft 78 as the shaft is rotated. This snug engagement between the guide surfaces 94, 96 and 98 and the shaft 78 is particularly important since it prevents wobbling and rotation of the yoke member 84 upon rotation of the cam means 78. The shapes of the guide surfaces 94, 96 and 98, on the other hand, limit the movement of yoke member 84 to translatory movement only. This translatory movement of the yoke member 84 is particularly important since it produces a shifting movement of another component of the valve as will be hereinafter explained.

Although the movement of the yoke member 84 in the preferred embodiment of the present invention is limited to translatory movement only, it will be understood that other types of movement can be imparted to yoke member 84 by merely changing the dimensions of aperture 92 or the shapes of any or all of the guide surfaces 94, 96 and 98.

Figure 1:
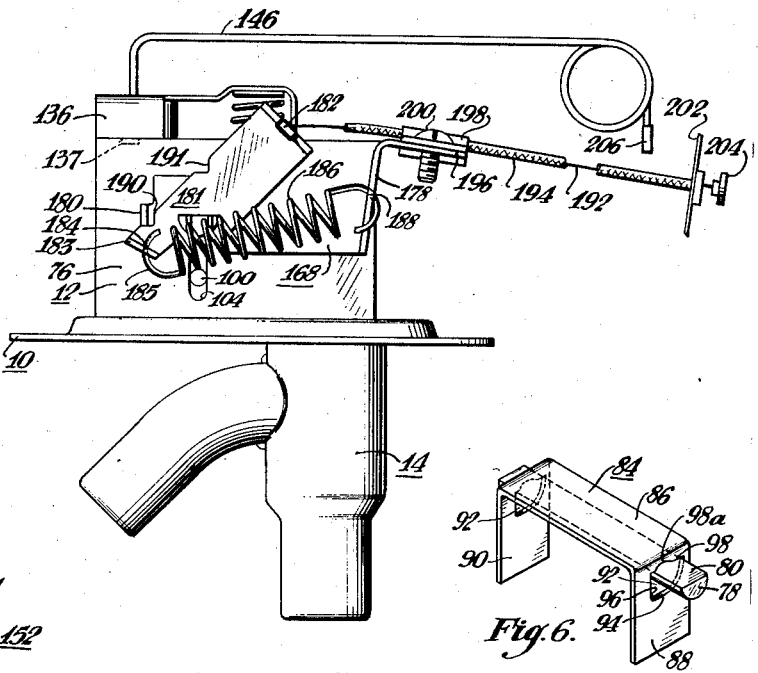
Fig. 1 is a side elevation including the cam lever, control cable and sensing element.

Carried by yoke member 84 is a support means 100, in this instance an elongated shaft having end portions 102 (only one end portion 102 being shown) extending beyond the end portions 88 and 90 of yoke member 84, as is best shown in Fig. 3. Each end portion 102 of shaft 100 extending beyond end portions 88 and 90 of yoke member 84 projects into an elongated guide slot 104 in the side walls of frame member 12, only one guide slot 104 being shown in side wall 76 as best seen in Fig. 1. Each guide slot 104 is elongated to accommodate the translatory movement of shaft 100, the translatory movement of shaft 100 produced by the rotation of cam means 78 and the resultant translatory movement of yoke member 84.

Pivotally mounted on support means 100 for rotation thereabout and translatory movement therewith is a channel-shaped valve control lever generally designated by the reference numeral 106. Valve control lever 106 comprises a floor portion 108 and a pair of opposed wall portions 110, only one wall portion 110 being shown. To provide a pivotal connection between the support means 100 and the control lever 106, shaft 100 extends through a pair of aligned, elongated apertures 112 in the opposed side walls 110 of the control lever, only one of the apertures 112 being shown, as best seen in Fig. 2. The apertures 112 are elongated to permit movement of the control lever 106 relative to the support shaft 100 and thus provide a pivotal connection between control lever 106 and shaft 100 which is capable of adjustment, as will be more fully described and explained hereinafter.

Adjacent its left end 114, as viewed in the drawing, control lever 106 engages the upper spherical end 42 of the valve stem 32. Inwardly and adjacent the point of contact with spherical end 42 of the valve stem 32, control lever 106 is provided with a transversely extending recess 116 therein. The transversely extending recess 116 is adapted to seat a plurality of conical-shaped projections 118 formed on one side of a substantially L-shaped link 120, only one of the projections 118 being shown. The projections 118 enable the link 120 to be pivotally supported on the floor portion 108 of control lever 106. Link 120 has integrally formed at one end thereof a small projection or tab 122 and adjacent the opposite end thereof is recessed to provide a seat 124 for a power means, the power means to be discussed more in detail hereinafter.

Figure 5:
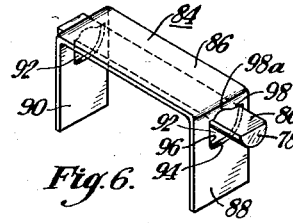
Fig. 5 is a perspective view of a C-shaped clamp shown in Figs. 2 and 3.

Adapted to engage link 120 and operatively connect link 120 to valve stem 32 is a clamp means or C-shaped clamp generally designated by the reference numeral 126. As best shown in Fig. 5, the clamp 126 has a small slot 128 extending therethrough adjacent one end and, at the opposite end, is provided with a V-shaped notch 130 formed therein, the V-shaped notch 130 terminating in a circular aperture 131. As can best be seen in Figs. 2 and 3, the small slot 128 in clamp 126 is adapted to receive the tab 122 on link 120 to operatively connect link 120 and clamp 126 whereas the aperture 131 at the opposite end of clamp 126 is adapted to be positioned on the underside of spherical head 42 on the upper end of valve stem 32.

The aperture 131 in clamp 126 is slightly larger in diameter than the reduced diameter portion 40 of valve stem 32 to facilitate the assembly of clamp 126 thereon. Aperture 131 also provides an increased surface area of contact between the clamp 126 and the lower surface of the spherical head 42 of the valve stem 32, this increased surface area being particularly important when control lever 106 is rotated clockwise, viewing Fig. 2, to move valve member 24 toward the closed position. As control lever 106 is moved clockwise, the increased surface area afforded by aperture 131 will tend to apply the forces moving the valve member 24 substantially along the axis of movement of the valve member and thereby eliminate any binding or improper seating of the valve member.

The seat 124 of link 120 is adapted to seat one end of a power means 133, in this instance a single compression spring. The opposite end of the compression spring 133 is seated around an annular flange 132 formed in the canopy portion 134 of a housing 136 mounted on the ceiling 74 of C-shaped frame member 12, the housing member 136 to be described more in detail hereinafter. With compression spring 133 seated on the spring seat 124, it can readily be seen that this compression spring 133 provides a plurality of functions. In addition to biasing link 120 in a clockwise direction and operatively connecting control lever 106 and valve stem 32, the spring 133 constantly biases control lever 106 in a counterclockwise direction and holds several of the components of valve in assembled engagement. The assembled engagement of link 120 and clamp 126 and the assembled engagement of the half-round cam shaft 78 and yoke member 84 with its guide surfaces 94, 96 and 98 are both effected by the force of spring 133.

Disposed above the right end of control lever 106 in ceiling 74 of C-shaped frame member 12, as best seen in Fig. 2, is a thermostatic element generally designated by the reference numeral 138. The element 138 comprises a body member 140 which houses the stem of a reciprocable piston 142 movable into and out of body portion 140 in response to changes in a temperature condition. The element 138 is furthermore provided with an upper cylindrical portion 144 into which projects one end of a capillary tube 146, the capillary tube 146 extending through a hole 147 in housing member 136. The capillary tube 146 contains a liquid which changes in volume upon a change in a temperature condition and thus imparts movement to the piston 142 to effect rotation of the control lever 106. Inasmuch as thermostatic elements of this type are well known in the art, further discussion concerning the structure and function thereof is deemed unnecessary.

Portion 140 of thermostatic element 138 is adapted to project downwardly through an aperture 148 in roof 74 of U-shaped frame member 12, aperture 148 being positioned so that the piston 142 of the thermostatic element will be in alignment with a bump or projection 149 extending from a recessed portion 150 formed in the control lever 106 adjacent the right end thereof as viewed in Fig. 2. Thus, it can readily be seen that as the liquid in capillary 146 expands due to an increase in a temperature condition, piston 142 will be moved downwardly and tend to rotate control lever 106 in a clockwise direction, the clockwise movement of control lever 106 moving valve member 24 toward its closed position.

Although not shown by Fig. 2, it will be understood that the projection 149 in recess 150 in control lever 106 will in most positions of control lever 106 be in engagement with thermostatic element piston 142 due to the force of spring 133, spring 133 constantly tending to rotate control lever 106 in a counterclockwise direction. As shown in Fig. 2, the recess projection 149 is not in contact with piston 142 because the control lever 106 is in its lowermost position relative to the thermostatic element 138 and the piston 142 is in an unextended position.

Figure 4:
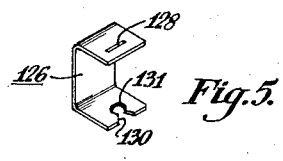
Fig. 4 is a perspective view of the calibration wedge.

To insure the closing of valve member 24 when the air entering the passenger compartment acquires a predetermined temperature, the thermostatically controlled fluid valve is provided with a calibration means generally designated by the reference number 152. As best shown in Fig. 4, calibration means 152 is substantially wedge-shaped and is provided with a pair of spaced frame arms 154 and 156 having inclined undulated surfaces 158 and 160 respectively along one edge thereof. As shown in Fig. 2, the calibration means 152 is adapted to be positioned between the supporting shaft 100 and the bottom surface of floor portion 108 of control lever 106 to selectively vary the position of the control lever 106 relative to the thermostatic element piston 142. The calibration means 152 may be adjustably positioned on shaft 100 by merely moving the calibration means longitudinally of control lever 106 in one direction or the other, the undulations in the inclined undulated surfaces 158 and 160 registering with the periphery of supporting shaft 100. To facilitate the positioning and the adjustment of calibration means 152, the calibration means is provided with a tab 161 integrally formed therewith and extending longitudinally thereof. Tab 161 permits calibration means 152 to be grasped by the fingers or positioned with the aid of a suitable tool.

Mounted on top of C-shaped frame member 12 on the outer surface of ceiling 74 and housing the upper portion 144 of thermostatic element 138 is a channel-shaped housing member 136. Housing member 136 is secured to ceiling 74 by ears 137 (one ear shown in dotted lines in Fig. 1) integrally formed on housing member 136, the ears 137 extending through apertures (not shown) in ceiling 74 and being clenched on the underside thereof. Integrally formed with housing member 136 and extending longitudinally of frame member 12 is a canopy portion 134. As hereinbefore mentioned, canopy portion 134 is provided with an annular flange 132 therein providing a spring seat for compression spring 130. Adjacent annular flange 132, canopy portion 134 is provided with an angular-bent portion 162 terminating in another angular-bent portion 164. Bent portion 162 of canopy 134 extends downwardly through a hole 166 in frame ceiling 74 and the angular-bent portion 164 extends along and is secured to the inner surface of ceiling 74 by any suitable means. It will also be noted that hole 166 in frame ceiling 74 receives compression spring 130.

Secured to the outer surface of wall 76 of frame member 12, as shown in Fig. 1, is a bracket generally designated by the reference numeral 168. On one end, the bracket 168 is provided with an L-shaped extension 178, while on the opposite end, bracket 168 is provided with an integral lug 180 bent at a right angle thereto. As best shown in Fig. 1, it will also be noted that the half-round cam shaft 78 extends through and beyond bracket 168 and has mounted thereon a crank arm generally designated by the reference numeral 181. On one end, crank arm 181 is provided with a lug 182 integrally formed therewith and projecting at a right angle therefrom. At the opposite end, crank arm 181 is provided with a right angular-bent portion 183 having an aperture or notch 184 extending therethrough and adapted to receive one end 185 of a tension spring 186. The opposite end of tension spring 186 is anchored in an aperture 188 extending through the L-shaped extension 178 of bracket 168.

Crank arm 181 is also provided with a pair of V-shaped notches 190 and 191 along one edge thereof. The notches 190 and 191 are adapted to cooperate with the lug 180 formed on bracket 168 to limit the rotary movement of crank arm 181, notch 190 limiting the rotation of crank arm 181 in a clockwise direction and notch 191 limiting the rotation of crank arm 181 in a counterclockwise direction.

As shown in Fig. 1, a control cable 192 enclosed in a sheath 194 has one end attached to the lug 182 at the upper end of crank arm 181. The control cable 192 and sheath 194 are retained in a suitable operating position by a clamp 198 cooperating with longitudinally extending portion 196 of the L-shaped extension 178 of bracket 168, the clamp 198 being retained on portion 196 by means of a screw 200. The opposite end of the control cable 192 preferably extends to the dash board 202 in the vehicle passenger compartment and has a control knob 204 mounted on the free end thereof. If it is desired to rotate the crank arm 181 and cam shaft 78 in a clockwise direction, viewing Fig. 1, the occupant of the passenger compartment merely has to pull on the control knob 204, whereas if it is desired to rotate the crank arm 181 and cam shaft 78 in a counterclockwise direction, the occupant of the passenger compartment merely has to push on the control knob 204, tension spring 186 constantly tending to rotate crank arm 181 in a counterclockwise direction and thus preventing buckling of control cable 192.

Capillary 146 is provided with a bulb 206 on the free end thereof. Although not shown in Fig. 1, bulb 206 extends into the passenger compartment in the vehicle and is positioned adjacent the discharge side of the heater or heat exchanger in the stream of heated air. By placing the bulb 206 in this position, the valve member 24 will move between its controlling positions in response to changes in the temperature of the air entering the passenger compartment to accurately regulate the flow of fluid to the heat exchanger.

While the preferred embodiment of the invention in Fig. 1 shows the use of a bulb 206 on the free end of the capillary 146, the bulb 206 can be eliminated by coiling the capillary 146 several times into a tight loop (not shown in the drawing) and disposing the loop in the desired temperature sensing position, i. e., in the stream of heated air entering the passenger compartment. The use of a coiled loop enjoys the particular advantage of concentrating a large percentage of the liquid in the capillary 146 in the temperature sensing position to thereby increase the operational accuracy of the thermostatic element piston 142.

It will also be noted that the capillary 146 as shown in Fig. 1 is totally unsupported and unattached except for the portion thereof that projects downwardly into the thermostatic element 138. In the actual reduction to practice of the invention, however, a portion of the capillary 146 is reversely bent and fastened to the ceiling 74 of frame member 12 (bent portion of capillary not shown on the drawing) by means of an arm (not shown) extending downwardly from canopy portion 134 of housing member 136. The arm is attached to the ceiling 74 by any suitable means, with a portion of the capillary interposed between the arm and ceiling 74. Attaching a portion of the capillary 146 to ceiling 74 stabilizes the capillary and prevents breakage or rupture of the capillary at the point where it enters the upper cylindrical portion 144 of thermostatic element 138 or the hole 147 in housing member 136.

Fig. 6 shows another embodiment of the yoke member 84 of the present invention wherein one of the guide surfaces in apertures 92 in yoke member 84 is modified in shape to decrease the translatory movement of yoke member 84 upon rotation of the half-round shaft 78. In this embodiment, the straight-line upper guide surface 98 of each aperture 92 has been modified to include an upwardly curved portion 98a therein intermediate the ends thereof. The curved portion 98a is particularly effective in reducing the vertical lift or movement of yoke member 84 after the shaft 78 has been rotated clockwise approximately 30° from the position shown in Fig. 6.

*Operation*

Referring to Fig. 2, the valve member 24 is shown in its wide open position, which is the total length of its stroke and which permits the maximum flow of hot water to the heat exchanger. In this position of the valve member 24, it will be noted in Fig. 1 that the crank arm 181 has been rotated the maximum clockwise distance, notch 190 on the crank arm engaging the lug 180 on bracket 168. In this position of the crank arm 181, the cam shaft 78 has been rotated to the position shown in Figs. 1, 2, and 3, the guide surface 98 in the yoke member 84 engaging the flat portion 80 of the cam shaft.

In this position of the crank arm 181 and cam shaft 78, it will also be noted that the yoke member 84 and the valve member control lever 106 are in their lowermost position relative to thermostatic element 138. With the control lever 106 in its lowermost position, it is also quite obvious that the axis of rotation of control lever 106 is in its lowermost position and is positioned a maximum distance from the movable piston 142 of thermostatic element 138. The control lever being in this position, it will readily be appreciated by those skilled in the art that the piston 142 will have to move downwardly almost the total increment of its stroke to effect sufficient rotation of control lever 106 to move valve member 24 to the closed position.

Thus, it can readily be seen that if the control cable 192 is pulled to initially place the components of the valve in the positions shown in Figs. 1 and 2, the thermostatically controlled valve will be operating at a maximum heat range and air will be supplied to the passenger compartment at a maximum temperature.

Under actual operating conditions in a vehicle heating system, the thermostatically controlled valve will be operated at maximum heat range usually or only when the temperature of the outside atmosphere is relatively cold, for example, about 30° F. With the atmospheric air at this low temperature, the valve must supply the heat exchanger with a substantially large amount of hot water to elevate the temperature of the incoming air to a degree suitable for passenger comfort. If the temperature on a cold day remains fairly constant, the valve member 24 will remain in the wide open position and supply heated air to the passenger compartment at substantially a constant temperature.

On the other hand, should the temperature of the atmospheric air increase while the valve is operating at maximum heat range, the temperature of the air entering the passenger compartment will also increase and the valve member 24 will be moved toward the closed position. However, with the valve operating at maximum heat range, it can readily be seen that the downward movement of thermostatic element piston 142 necessary to move the valve member 24 completely to the closed position will produce an extremely high and uncomfortable temperature of the air entering the passenger compartment. To avoid this extremely high temperature of the air entering the passenger compartment, it becames necessary to change the heat range of the valve.

To change the heat range of the valve, viewing Fig. 1, the control cable 92 is pushed inwardly a desired predetermined distance to move crank arm 181 in a counterclockwise direction a predetermined number of degrees. Rotation of crank arm 181 in a counterclockwise direction produces an identical counterclockwise rotation of cam shaft 78 and moves the peripheral surface of cam shaft 78 along guide surfaces 94, 96 and 98, raising yoke member 84 and the valve control lever 106. Such elevation of the control lever 106 moves the valve member 24 a predetermined distance toward its seat and also shifts the pivotal axis of the control lever. With the control lever 106 and valve member 24 in this position, the piston 142 has to move downwardly a much shorter distance in order to produce enough clockwise rotation of control lever 106 to move valve member 24 to the closed position. Hence, the heat range of the valve has been reduced and the air will be supplied to the passenger compartment at a predetermined reduced temperature, the reduction in heat range being proportional to the degree of counterclockwise rotation of the crank arm 181.

The present invention, therefore, enables the occupant of the passenger compartment of a vehicle to select the heat range of the thermostatically controlled valve compatible with the atmospheric temperature by merely pushing or pulling the control cable 192 to vary the position of crank arm 181. When the position of crank arm 181 has been changed, the valve will automatically maintain the temperature of the air entering the passenger compartment within the desired or predetermined temperature range.

To insure accuracy of operation of the thermostatically controlled valve and especially to insure the closing of the valve member 24 when the temperature of the air entering the passenger compartment acquires a predetermined degree, it is essential that the thermostatically controlled valve can be properly calibrated. This predetermined calibration temperature is usually selected as the maximum temperature of the air supplied by the heat exchanger to the vehicle passenger compartment. Therefore, to properly calibrate the operation of the thermostatically controlled fluid valve, the bulb 206 of the capillary is first exposed to a maximum predetermined temperature to extend piston 142. Crank arm 181 is then rotated the maximum distance clockwise into the position shown by Fig. 1 of the drawing. With the piston 142 extended downwardly and the control lever 106 now in its lowermost position, the calibration wedge 152 is moved longitudinally along control lever 106 until the projection 149 in control lever recess 150 engages the bottom surface of thermostatic element piston 142 and the control lever 106 is rotated a sufficient distance in a clockwise direction to move the valve member 24 into engagement with its seat 20. With the projection 149 engaging piston 142, any further increase in temperature at capillary bulb 206 will further extend piston 142 and merely serve to move valve member 24 into tighter engagement with its seat 20.

While only one embodiment of the present invention has been shown and described herein, it will be apparent that various changes may be made in the form and arrangement of parts and the details of construction herein disclosed without departing from the scope of the invention as defined in the appended claims.

It is claimed and desired to secure by Letters Patent:

1. In a thermostatically controlled fluid valve, the combination comprising a mounting member, a casing carried by said mounting member and provided with an inlet and an outlet for fluid therein intersected by a valve seat, a valve member in said casing movable in opposite directions between open and closed positions relative to said valve seat, a valve stem carried by said valve member, frame means carried by said mounting member and being oppositely disposed to said casing, cam means rotatably supported by said frame means, a yoke member carried by said cam means and being movable between a plurality of positions relative to said frame means upon rotation of said cam means, support means carried by said yoke member and defining an axis of rotation, wedge means rotatably carried by said support means, a control lever mounted on said wedge means for rotation about said support means and being connected to said valve stem, resilient means acting on said control lever and being operable to rotate said control lever in one direction in response to changes in a temperature condition to move said valve member in one direction relative to said valve seat, and thermally responsive means cooperable with said control lever for imparting rotation thereto in the opposite direction in response to changes in a temperature condition to thereby move said valve member in the opposite direction relative to said valve seat.

2. In a thermostatically controlled fluid valve, the combination comprising a mounting member, a casing carried by said mounting member and provided with an inlet and an outlet for fluid therein intersected by a valve seat, a valve member in said casing movable in opposite directions between open and closed positions relative to said valve seat, a valve stem carried by said valve member, frame means carried by said mounting member and being oppositely disposed to said casing, cam means rotatably supported by said frame means, a yoke member carried by said cam means and being movable between a plurality of positions relative to said frame means upon rotation of said cam means, support means carried by said yoke member, a control lever rotatably mounted on said support means and being engageable with said valve stem, link means rotatably mounted on said control lever, clamp means connecting said link means and said valve stem, resilient means acting on said link means to resiliently interconnect said link means, said clamp means, said control lever and said valve stem for unit movement and being operable to rotate said control lever in one direction in response to changes in a temperature condition to move said valve member in one direction relative to said valve seat, and thermally responsive means cooperable with said control lever for imparting rotation thereto in the opposite direction in response to changes in a temperature condition to thereby move said valve member in the opposite direction relative to said valve seat.

3. A thermostatically controlled fluid valve comprising a mounting member, a casing carried by said mounting member and provided with an inlet and an outlet for fluid therein intersected by a valve seat, a valve member in said casing movable in opposite directions between open and closed positions relative to said valve seat, a valve stem carried by said valve member, frame means carried by said mounting member and being oppositely disposed to said casing, a yoke member having a pair of apertures therein, a cam shaft rotatably supported by said frame means and being received within said apertures for supporting said yoke member, support means carried by said yoke member and defining an axis of rotation, wedge means rotatably carried by said support means, a control lever mounted on said wedge means for rotation about said support means, link means rotatably mounted on said control lever, clamp means connecting said link means and said control lever, resilient means acting on said link means to resiliently interconnect said link means, said clamp means, said valve stem and said control lever for unit movement and being operable to rotate said control lever in one direction in response to changes in a temperature condition to move said valve member in one direction relative to said valve seat, thermally responsive means cooperable with said control lever and being operable to rotate said control lever in the opposite direction in response to changes in a temperature condition to move said valve member in the opposite direction relative to said valve seat, and lever means carried by said cam shaft for imparting rotation thereto to shift the position of said yoke member to thereby shift the axis of rotation of said control lever relative to said thermally responsive means.

4. A thermostatically controlled fluid valve as claimed in claim 3 wherein said cam shaft is comprised of a half-round shaft.

5. A thermostatically controlled fluid valve as claimed in claim 3 wherein the shape of each of said apertures in said yoke member is defined by a pair of uniplanar side walls intersecting each other at approximately a right angle and a curvilinear side wall intersecting both of said uniplanar side walls, said side walls providing guide surfaces for said cam shaft.

6. A thermostatically controlled fluid valve as claimed in claim 3 wherein said resilient means is comprised of a single compression spring.

7. A thermostatically controlled fluid valve as claimed in claim 3 wherein said wedge means is provided with a pair of spaced frame arms having inclined undulated surfaces along one edge thereof, said undulated surfaces on each arm being adapted to selectively register with said support means whereby the position of said wedge means and said control lever relative to said support means may be selectively varied.

8. A thermostatically controlled fluid valve as claimed in claim 3 wherein a spring is connected to said lever means for urging same in one direction of rotation and a cable or the like is attached to said lever means for manually rotating same in the opposite direction.

References Cited in the file of this patent

UNITED STATES PATENTS

| | | |
|---|---|---|
| 221,978 | Sanderson | Nov. 25, 1879 |
| 1,376,462 | Robertshaw | May 3, 1921 |
| 1,449,005 | Hoyt | Mar. 20, 1923 |
| 1,849,906 | Carson | Mar. 15, 1932 |
| 1,956,831 | Hutchinson | May 1, 1934 |